United States Patent
Brown et al.

(10) Patent No.: US 6,303,708 B1
(45) Date of Patent: Oct. 16, 2001

(54) FUNCTIONAL POLY(PHENYLENE ETHER)/ POLY(ARYLENE SULFIDE)/EPOXY FUNCTION ALPHA OLEFIN ELASTOMER/ ELASTOMERIC BLOCK COPOLYMER/ METAL SALT COMPOSITIONS AND PROCESS FOR MAKING THEREOF

(75) Inventors: Sterling Bruce Brown, Schenectady, NY (US); Chorng-Fure Robin Hwang, Cary, NC (US); Hiromi Ishida, Moka (JP); James Joseph Scobbo, Jr., Slingerland; John Bennie Yates, III, Glenmont, both of NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 08/405,668

(22) Filed: Mar. 17, 1995

(51) Int. Cl.$^7$ ..................................................... C08L 53/00
(52) U.S. Cl. ........................ 525/925; 525/189; 525/390; 525/397; 525/537
(58) Field of Search ................................. 524/399, 400; 525/920, 923, 189, 190, 397, 537

(56) References Cited

U.S. PATENT DOCUMENTS

| | | | |
|---|---|---|---|
| 4,021,596 | 5/1977 | Bailey | 428/375 |
| 4,418,029 | * 11/1983 | Reed et al. | 524/399 |
| 4,451,607 | 5/1984 | Garcia et al. | 524/494 |
| 4,476,284 | 10/1984 | Clearly | 525/92 |
| 4,528,346 | 7/1985 | Sugie et al. | 525/523 |
| 4,680,329 | * 7/1987 | Brown et al. | 524/399 |
| 4,704,448 | 11/1987 | Brugel | 528/125 |
| 4,889,893 | 12/1989 | Kobayashi et al. | 525/189 |
| 5,047,465 | 9/1991 | Auerbach | 524/504 |
| 5,122,578 | 6/1992 | Han et al. | 525/537 |
| 5,162,433 | 11/1992 | Nishio et al. | 525/66 |
| 5,214,083 | * 5/1993 | Kodaira et al. | 525/390 |
| 5,227,429 | 7/1993 | Kawamwa et al. | 525/537 |
| 5,290,881 | 3/1994 | Dekkers | 525/397 |
| 5,292,789 | * 3/1994 | Ishida et al. | 525/98 |

FOREIGN PATENT DOCUMENTS

| | | |
|---|---|---|
| 0 104 543 A1 | 4/1984 | (EP) . |
| 0 225 144 B1 | 6/1987 | (EP) . |
| 0 228 268 B1 | 7/1987 | (EP) . |
| 0 341 421 A2 | 4/1989 | (EP) . |
| 0 341 422 A2 | 11/1989 | (EP) . |
| 0 360 544 A2 | 3/1990 | (EP) . |
| 0 368 413 A2 | 5/1990 | (EP) . |
| 0368413 | * 5/1990 | (EP) . |
| 0 394 933 A3 | 10/1990 | (EP) . |
| 0 405 135 A1 | 1/1991 | (EP) . |
| 0 407 216 A1 | 1/1991 | (EP) . |
| 0 412 572 A2 | 2/1991 | (EP) . |
| 0 438 051 A3 | 7/1991 | (EP) . |
| 0 438 777 A3 | 7/1991 | (EP) . |
| 0 472 913 A2 | 3/1992 | (EP) . |
| 0 472 960 A3 | 3/1992 | (EP) . |
| 0 475 038 A2 | 3/1992 | (EP) . |
| 0 479 560 A2 | 4/1992 | (EP) . |
| 0 506 006 A2 | 9/1992 | (EP) . |
| 524705-A2 | 1/1993 | (EP) . |
| 0 549 977 A1 | 7/1993 | (EP) . |
| 50156561-A | 12/1975 | (JP) . |
| 60053562-A | 3/1985 | (JP) . |
| 61021156-A | 1/1986 | (JP) . |
| 62-65351 | 3/1987 | (JP) . |
| 63-97662 | 4/1988 | (JP) . |
| 63205358-A | 8/1988 | (JP) . |
| 01031862-A | 2/1989 | (JP) . |
| 1-213360 | 8/1989 | (JP) . |
| 1-213361 | 8/1989 | (JP) . |
| 1-240566 | 9/1989 | (JP) . |
| 01259060-A | 10/1989 | (JP) . |
| 1-266160 | 10/1989 | (JP) . |
| 2-75656 | 3/1990 | (JP) . |
| 02155951-A | 6/1990 | (JP) . |
| 2-252761 | 10/1990 | (JP) . |
| 03126761-A | 5/1991 | (JP) . |
| 3-121159 | 5/1991 | (JP) . |
| 3-126761 | 5/1991 | (JP) . |
| 3-153757 | 7/1991 | (JP) . |
| 3205452-A | 9/1991 | (JP) . |
| 3-244661 | 10/1991 | (JP) . |
| 3-265661 | 11/1991 | (JP) . |
| 4-59870 | 2/1992 | (JP) . |
| 4-59871 | 2/1992 | (JP) . |
| 4096972-A | 3/1992 | (JP) . |
| 4-122770 | 4/1992 | (JP) . |
| 04132766-A | 5/1992 | (JP) . |
| 4-130158 | 5/1992 | (JP) . |
| 4-198268 | 7/1992 | (JP) . |
| 04211926-A | 8/1992 | (JP) . |
| 04213358-A | 8/1992 | (JP) . |
| 4-211927 | 8/1992 | (JP) . |
| 4-213358 | 8/1992 | (JP) . |
| 04259540-A | 9/1992 | (JP) . |
| 4264163-A | 9/1992 | (JP) . |
| 4-318067 | 11/1992 | (JP) . |
| 4-339861 | 11/1992 | (JP) . |
| 5098159-A | 4/1993 | (JP) . |
| 5170907-A | 7/1993 | (JP) . |
| 5320506-A | 12/1993 | (JP) . |
| 5339501-A | 12/1993 | (JP) . |
| WO 92/01749 | 3/1991 | (WO) . |

* cited by examiner

Primary Examiner—Robert Dawson

(57) ABSTRACT

A composition is provided which comprises a functionalized poly(phenylene ether) resin, poly(arylene sulfide) resin, epoxy functional alpha-olefin elastomer, elastomeric block copolymer, and a metal salt. The composition is preferably prepared by premixing a poly(phenylene ether) resin with an organic acid and a vinyl aromatic-diene block copolymer to form a premix, and then compounding the premix with an epoxy functional alpha-olefin elastomer, a poly(arylene sulfide) resin and a metal salt of an organic acid. The composition has enhanced levels of mechanical properties such as impact strength, and is suitable for making molded articles such as vertical automotive body panels.

23 Claims, No Drawings

FUNCTIONAL POLY(PHENYLENE ETHER)/POLY(ARYLENE SULFIDE)/EPOXY FUNCTION ALPHA OLEFIN ELASTOMER/ELASTOMERIC BLOCK COPOLYMER/METAL SALT COMPOSITIONS AND PROCESS FOR MAKING THEREOF

BACKGROUND OF THE INVENTION

1. Field of the Invention

The present invention relates to poly(phenylene ether)/poly(arylene sulfide) resin compositions, and more particularly relates to impact modified poly(phenylene ether)/poly(arylene sulfide) resin compositions.

2. Description of the Related Art

Poly(phenylene sulfide)/poly(phenylene ether) blends are generally known. Such blends however have typically lacked the desired level of one or more mechanical properties. Property improvements have been obtained by the addition of an agent such as an aliphatic polycarboxylic acid or a compound having a two-fold or three-fold carbon-to-carbon bond and a carboxylic acid, etc., see, for example, Dekkers, European Patent Application 341,422 published Nov. 15, 1989 which further discloses that partially hydrogenated styrene-(ethylene/butylene)-styrene triblock copolymers may be contained in the composition, and the reference further discloses premixing the poly(phenylene ether) resin and the agent in an extruder. In order for such compositions to be suitable as materials for automotive parts, they must exhibit enhanced physical properties and specifically they must exhibit high impact strength properties.

Accordingly, there is a need to provide poly(phenylene ether)/poly(arylene sulfide) resin blends which exhibit enhanced impact properties.

SUMMARY OF THE INVENTION

The present invention involves a functional poly(phenylene ether) resin, poly(arylene sulfide) resin (herin after called "PPS"), epoxy functional alpha-olefin elastomer, elastomeric block copolymer, metal salt composition and process for making the same. Preferably the composition is made by precompounding a poly(phenylene ether) resin (herein after called "PPE") with a polyfunctional compatibilizer such as, for example, citric acid or fumaric acid and with the elastomeric block copolymer in order to prepare a premix comprising a functionalized PPE, and then further compounding the premix with the PPS, epoxy functional alpha-olefin elastomer and metal salt such as zinc stearate in order to obtain the final composition exhibiting the enhanced levels of impact strength. The compositions are useful for making automotive parts in that the preferred compositions exhibit the combined properties of low coefficient of thermal expansion, low moisture absorption, high heat distortion temperature, good chemical resistance, long term heat stability, and high levels of impact strength.

DETAILED DESCRIPTION OF THE INVENTION

The compositions contain a functional PPE, PPS, epoxy functional alpha-olefin elastomer, elastomeric block copolymer, and a metal salt. The resulting compositions exhibit enhanced impact strengths over simple impact modified functional PPE/PPS compositions. By premixing a functional compound with PPE and the elastomeric block copolymer, a premix containing a functional PPE with the elastomeric block copolymer can be obtained, and then by mixing the premix with the PPS, epoxy functional alpha-olefin elastomer and metal salt, a composition exhibiting a desirable morphology and enhanced impact strength can be obtained.

The PPE employed in the present invention are known polymers comprising a plurality of structural units of the formula (I):

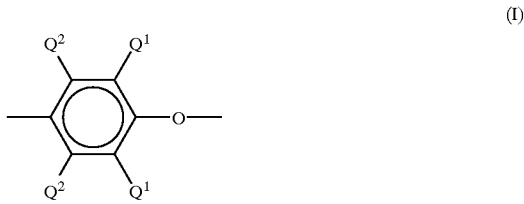

(I)

wherein in each structural unit independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes and elastomers, as well as coupled PPE in which coupling agents such as low molecular weight polycarbonates, quinones, heterocycles and formals undergo reaction in known manner with the hydroxy groups of two PPE chains to produce a higher molecular weight polymer.

The PPE generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl./g., as measured in chloroform at 25° C.

The PPE are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, iron, manganese or cobalt compound, usually in combination with various other materials.

Particularly useful PPE for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the PPE contemplated for use in the present invention include all those presently known, irrespective of variations in structural units or ancillary chemical features.

One way to prepare the functionalized PPE is to react the PPE with at least one polyfunctional compatibilizer compound. One class of compounds that is useful for this purpose comprises materials that have both:

(a) a carbon-carbon double bond or a carbon-carbon triple bond; and (b) a carboxylic acid, anhydride, hydroxy, epoxy, trialkyl ammonium carboxylate, amino group or derivatives of such groups.

Typical examples of materials that fit these criteria for preparing appropriately functionalized PPE include maleic anhydride, fumaric acid, maleimides such as N-phenylmaleimide and 1,4-phenylene-bis-methylene-α,α'-bismaleimide, maleic hydrazide, methylnadic anhydride, fatty oils (e.g., soybean oil, tung oil, linseed oil, sesame oil), unsaturated carboxylic acids such as acrylic, crotonic, methacrylic acid and oleic acid, unsaturated alcohols such as allyl alcohol and crotyl alcohol and unsaturated amines such as allylamine and trialkyl amine salts of unsaturated acids such as triethylammonium fumarate and tri-n-butylammonium fumarate. Such typical reagents for preparing a useful functional PPE are described in U.S. Pat. Nos. 4,315,086, 4,755,566, and 4,888,397, which are incorporated herein by reference.

It is sometimes advantageous to use an initiator in the preparation of the functionalized PPE with the olefinic compound. Suitable initiators for use in the current invention include free radical initiators generally known to the art Specific initiators include various peroxides and hydroperoxides. Specific examples include benzoyl peroxide, 2,5-dimethyl-2,5-di(t-butylperoxy) hexane, dicumyl peroxide, 2,5-dimethyl-2,5-di(t-butylperoxy)hexyne-3 and cumene peroxide, with 2,5,-dimethyl-2,5-di(t-butylperoxy)hexyne-3 being preferred. When it is used, the amount of initiator used can vary of from about 0.05 weight percent to about 0.5 weight percent relative to the weight of the PPE.

Other polyfunctional compatibilizer compounds suitable for use herein are characterized as having both (a) a group represented by the formula (OR) wherein R is hydrogen or an alkyl, aryl, acyl or carbonyl dioxy group and (b) at least two groups each of which may be the same or different selected from carboxylic acid, acid halide, acid anhydride, anhydride, acid halide anhydride, acid ester, acid amide, imido, amino and salts thereof. Typical of this group of compatibilizers are the non-polymeric aliphatic polycarboxylic acids, acid esters and acid amides represented by the formula (II):

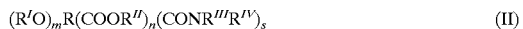

$$(R^{I}O)_{m}R(COOR^{II})_{n}(CONR^{III}R^{IV})_{s} \qquad (II)$$

wherein R is a linear or branched chain, saturated aliphatic hydrocarbon of from 2 to 20, preferably 2 to 10, carbon atoms; $R^{I}$ is selected from the group consisting of hydrogen or an alkyl, aryl, acyl or carbonyl dioxy group of 1 to 10, preferably 1 to 6, most preferably 1 to 4, carbon atoms, especially preferred is hydrogen; each $R^{II}$ is independently selected from the group consisting of hydrogen or an alkyl or aryl group of from 1 to 20 carbon atoms preferably from 1 to 10 carbon atoms; each $R^{III}$ and $R^{IV}$ is independently selected from the group consisting essentially of hydrogen or an alkyl or aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero and wherein ($OR^{I}$) is alpha or beta to a carbonyl group and at least two carbonyl groups are separated by 2 to 6 carbon atoms. Obviously, $R^{I}$, $R^{II}$, $R^{III}$ and $R^{IV}$ cannot be aryl when the respective substituent has less than 6 carbon atoms.

Illustrative of suitable non-polymeric polycarboxylic acids include, for example, citric acid, malic acid, and agaricic acid; including the various commercial forms thereof, such as, for example, the anhydrous and hydrated acids. Illustrative of acid esters useful herein include, for example, acetyl citrate and mono- and/or di- stearyl citrates and the like. Suitable acid amides useful herein include, for example, N,N'-diethyl citric acid amide, N,N'-dipropyl citric acid amide, N-phenyl citric acid amide, N-dodecyl citric acid amide, N,N'-didodecyl citric acid amide and N-dodecyl malic acid amide. Derivatives of the foregoing polycarboxylic acids are also suitable for use in the practice of the present invention. Suitable functionalizing compounds can be found in U.S. Pat. Nos. 4,315,086, 4,755,566 and 5,000,897, which are incorporated herein by reference.

The polyfunctional compatibilizer compound (also referred to as the functionalizer) is preferably selected from the group consisting of citric acid, maleic acid, maleic anhydride, agaricic acid, malic acid, or fumaric acid or derivatives thereof. The derivatives may be esters, amides, anhydrides, hydrates, or salts of these acids. Examples of esters include citric acid ethyl ester, acetyl citrate and mono- and distearyl citrates. Examples of amides include N,N'-diethyl amides, N,N'-dipropyl amides, N-phenyl amides, N-dodecyl amides, N,N'-didodecyl amides of citric acid, as well as N-dodecyl amides of maleic acid. Examples of salts include calcium maleate, calcium citrate, potassium maleate, potassium citrate and ammonium salts such as tri-alkyl ammonium and triaryl ammonium.

The reaction to prepare the functionalized PPE may be conducted in solution using a substantially inert diluent such as toluene, xylene, chlorobenzene, o-dichlorobenzene or 1,2,4-trichlorobenzene, followed by isolation of the functionalized PPE by conventional operations such as precipitation by a non-solvent therefor. It is also possible to conduct the reaction in the melt. Melt reactions are often preferred and are conveniently carried out in an extruder or similar equipment.

The reaction between the PPE and the olefinic compound is typically conducted at temperatures in the range of about 100°–350° C. The proportions of reagents are subject to wide variation, depending on the degree of functionalization desired and the conditions used; the weight ratio of olefinic compound to polyphenylene ether is typically in the range of about 0.1% to 4% by weight based on the amount of weight of the PPE for melt reactions. For solution reactions, the weight ratio of olefinic compound to PPE can be much broader, for example, between about 0.1% to about 8.5% by weight or higher, based on the amount of weight of the PPE.

The PPS used in the present invention are derived from the known polymers containing arylene groups separated by sulfur atoms. They include poly(phenylene sulfide)s, for example poly(p-phenylene sulfide), and substituted poly (phenylene sulfide)s. Typical PPS comprise at least 70 molar %, preferably at least 90 molar %, of recurring units of the structural formula (III):

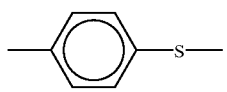
(III)

When the amount of said recurring units is less than 70 molar %, the heat resistance is somewhat limited.

The remaining 30 molar % or less, preferably 10 molar % or less, of the recurring units of PPS can be those of the following structural formulae (IV):

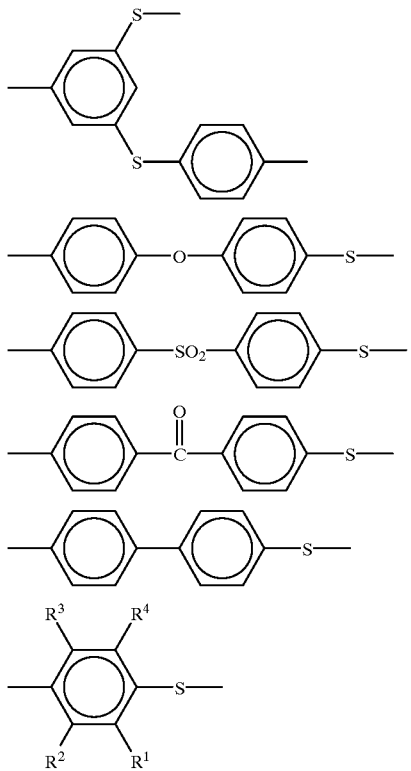
(IV)

wherein $R^1$, $R^2$, $R^3$ and $R^4$ are independently selected from the group consisting of hydrogen, halogen, alkyl, phenyl, alkoxy, aryloxy, nitro, amino and carboxy groups.

The PPS of the present invention may be a linear, branched or cured polymer or mixtures of the same. Linear PPS polymer of relatively low molecular weight may be prepared by, for example, the process disclosed in U.S. Pat. No. 3,354,129 which is incorporated herein by reference. Linear PPS polymers having a relatively high molecular weight may be prepared by, for example, the process disclosed in U.S. Pat. No. 3,919,177 which is incorporated herein by reference. Branched PPS resins may be prepared by the use of a branching agent, for example, 1,3,5-trichlorobenzene, which is disclosed in U.S. Pat. No. 4,749,163, which is incorporated herein by reference. The degree of polymerization of the polymers prepared by the process of U.S. Pat. Nos. 3,354,129, 3,919,177 and 4,749,163 can be further increased by heating in an oxygen atmosphere or in the presence of a crosslinking agent such as, for example, a peroxide after polymerization.

The PPS may be functionalized or unfunctionalized. If the PPS is functionalized, the functional groups may include, but are not limited to, amino, carboxylic acid, metal carboxylate, disulfide, thio and metal thiolate groups. One method for incorporation of functional groups into PPS can be found in U.S. Pat. No. 4,769,424, which is incorporated herein by reference, which discloses incorporation of substituted thiophenols into halogen substituted PPS. Another method involves incorporation of chlorosubstituted aromatic compounds containing the desired functionality reacted with an alkali metal sulfide and chloroaromatic compounds. A third method involves reaction of PPS with a disulfide containing the desired functional groups, typically in the melt or in a suitable high boiling solvent such as chloronapthalene.

Though the melt viscosity of PPS used in the present invention is not particularly limited so far as the moldings which can be obtained, a melt viscosity of at least 100 Poise is preferred from the viewpoint of the toughness of PPS per se and that of 10,000 Poise or less is preferred from the viewpoint of the moldability.

The PPS in this invention may also be treated to remove unwanted contaminating ions by immersing the resin in deionized water or by treatment with an acid, typically hydrochloric acid, sulfuric acid, phosphoric acid or acetic acid as found in Japanese Kokai Nos. 3236930-A, 1774562-A, 12299872-A and 3236931-A, all of which are incorporated herein by reference. For some product applications, it is preferred to have a very low impurity level, represented as the percent by weight ash remaining after burning a PPS sample. Typically ash contents less than about 1% by weight are desirable with ash numbers less than about 0.5% by weight preferred and ash numbers less than about 0.1% by weight most preferred.

The epoxy functional olefinic elastomer is preferably an olefinic copolymer containing about 60% to about 99.5% by weight of an α-olefin and about 0.5% to about 40% by weight of a glycidyl ester of an α,β-unsaturated carboxylic acid.

The olefinic copolymers used in the present invention are copolymers of an α-olefin with a glycidyl ester of an α,β-unsaturated carboxylic acid. α-Olefin as used herein means ethylene, propylene, butene-1, etc. Among them, ethylene is preferred. The glycidyl esters of the α,β-unsaturated acids are compounds of the general formula (V):

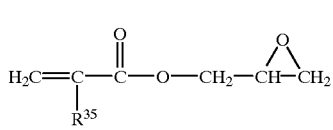
(V)

wherein $R^{35}$ represents a hydrogen atom or a lower alkyl group. Examples of the glycidyl esters of α,β-unsaturated acids include glycidyl acrylate, glycidyl methacrylate and glycidyl ethacrylate. The epoxy functional olefinic elastomer is preferably an olefinic copolymer containing of from about 60% to about 99.5% by weight of an α-olefin and of from about 0.5% to about 40% by weight of a glycidyl ester of an α,β-unsaturated carboxylic acid, preferably of from about 3% to about 30% by weight; based on the weight of the elastomer's composition. When this amount is less than about 0.5% by weight, no intended effects can be obtained and when it exceeds about 40% by weight, gelation occurs during melt-blending with PPS resulting in degradation of the extrusion stability, moldability and mechanical properties of the product. Suitable epoxy functional α-olefin elastomers include: ethylene-glycidyl acrylate copolymers, ethylene-glycidyl methacrylate copolymers, ethylene-glycidyl methacrylate-vinyl acetate terpolymers, ethylene-glycidyl methacrylate-methyl acrylate terpolymers, ethylene-ethyl acrylate-glycidyl methacrylate terpolymers. The preferred epoxy functional elastomers are available from Sumitomo Chemical Co. under the trademarks IGETABOND and BONDFAST, and from Elf Atochem under the trademark LOTADER.

The elastomeric block copolymers are preferably derived from alkenyl aromatic compounds and dienes. The block copolymers typically comprise monoalkenyl arene (usually styrene) blocks and conjugated diene (e.g. butadiene or isoprene) blocks and are represented as AB or ABA block copolymers. The conjugated diene blocks may be selectively hydrogenated. The block copolymers are typically diblock, triblock or radial teleblock, or mixtures thereof. The block copolymers may also comprise tapered blocks.

An especially preferred subclass of vinyl aromatic monomer-derived resins is the block copolymers comprising monoalkenyl arene (usually styrene) blocks and conjugated diene (e.g., butadiene or isoprene) or olefin (e.g., ethylene-propylene, ethylene-butylene) blocks and represented as AB and ABA block copolymers. The conjugated diene blocks may be partially or entirely hydrogenated, whereupon the properties are similar to the olefin block copolymers.

Suitable AB type block copolymers are disclosed in, for example, U.S. Pat. Nos. 3,078,254, 3,402,159, 3,297,793, 3,265,765 and 3,594,452 and U.K. Patent 1,264,741, all incorporated herein by reference. Examples of typical species of AB block copolymers include, e.g., polystyrene-polybutadiene (SBR), polystyrene-poly(ethylenepropylene) (S-EP), polystyrene-polyisoprene and poly($\alpha$-methylstyrene)-polybutadiene. Such AB block copolymers are available commercially from a number of sources, including Phillips Petroleum under the trademark SOLPRENE, from the Shell Chemical Co. under the trademark KRATON, and from Kuraray under the trademark SEPTON.

Additionally, ABA triblock copolymers and processes for their production as well as hydrogenation, if desired, are disclosed in U.S. Pat. Nos. 3,149,182, 3,231,635, 3,462,162, 3,287,333, 3,595,942, 3,694,523 and 3,842,029, which are all incorporated herein by reference.

Examples of triblock copolymers include polystyrene-polybutadiene-polystyrene (SBS), polystyrene-polyisoprene-polystyrene (SIS), poly($\alpha$-methyl-styrene)-polybutadiene-poly($\alpha$-methylstyrene) and poly($\alpha$-methylstyrene)-polyisoprene-poly($\alpha$-methylstyrene). Particularly preferred triblock copolymers are available commercially from Shell Chemical Co. under the trademarks CARIFLEX and KRATON.

The polymer mixture according to the invention comprises as the third essential constituent a non-elastomeric metal salt, with the exception of metal salts of dihydrocarboxyldithiophosphinic acid, having a melting temperature lower than the compounding temperature of the polymer mixture. The melting temperature of the metal salt can be significant. For example, when the melting temperature of the metal salt is equal to or higher than the compounding temperature of the polymer mixture, the metal salt is less effective for improving the mechanical properties. The compounding temperature is the temperature at which the constituents of the polymer mixture according to the invention are mixed to a more or less homogeneous mass in the melted condition or a similar condition. The compounding temperature generally is above 550° F., usually between approximately 550° F. and 650° F.

Suitable metal salts are inorganic or organic salts, more preferably metal salts of organic acids. Suitable organic acids are saturated and unsaturated aliphatic carboxylic acids, aromatic carboxylic acids, aliphatic and aromatic sulphonic or phosphonic acids and salts of alkyl hydrogen sulphates. The organic part of the salts preferably has a molecular weight below 500, more preferably below 300.

Specific organic acids include, but are not restricted to: benzoic, palmitic, lauric, acetic, stearic, gluconic, as well as dodecyl benzene sulphonic acids.

Suitable metal salts may be taken from a broad range of metals provided that the salt has a melting temperature lower than the polymer mixture compounding temperature. Metals such as calcium, aluminum and zinc are preferred but this does not preclude metals such as sodium, lithium, potassium, barium, beryllium, magnesium, copper, cobalt, and iron.

In particular metal salts of stearic acid are preferred due to their desireable melting points, high purity, and wide commercial availability.

As previously set out, the functional PPE is preferably the product of premixing the acid functional compound with the PPE, so the compositions as follows will be set out in weight percents of the functionalizer and weight percentages of the PPE, with it being understood that the resultant functional PPE is a product of premixing the two precursors. The PPE is preferably present at a level, expressed as percentages by weight of the total composition, of between about 20% and about 50% by weight, more preferably present at a level of about 25% to about 40% by weight, and most preferably present at a level of between about 30% and about 35% by weight; the functionalizer (such as citric acid) is preferably present at a level, expressed as percentages by weight of the total composition, of about 0.1% to about 5% by weight, more preferably present at a level of about 0.5% to about 2% by weight, and most preferably present at a level of about 0.6% to about 1% by weight; the elastomeric block copolymer is preferably present at a level, expressed as percentages by weight of the total composition, of about 2% to about 18% by weight, more preferably present at a level of about 3% to about 10% by weight, and most preferably present at a level of about 4% to about 7% by weight; the PPS is preferably present at a level, expressed as percentages by weight of the total composition, of about 40% to about 70% by weight, more preferably present at a level of about 45% to about 65% by weight, and most preferably present at a level of about 50% to about 60% by weight; the epoxy functional alpha-olefin elastomer is preferably present at a level, expressed as percentages by weight of the total composition, of from about 2% to about 18% by weight, more preferably present at a level of about 5% to about 10% by weight, and most preferably present at a level of about 6% to about 9% by weight; and the metal salt is preferably present at a level, expressed as percentages by weight of the total composition, of about 0.05% to about 5% by weight, more preferably present at a level of about 0.1% to about 1% by weight, and most preferably present at a level of about 0.1% to about 0.3% by weight.

The compositional ratios of the present invention can range from a level of about 10% to about 95% by weight of functional PPE, about 10% to about 95% by weight of PPS, about 1% to about 20% by weight of epoxy functional elastomer, about 1% to about 20% by weight of elastomeric block copolymer, and about 0.01% to about 10% by weight of metal salt in which all percent by weight ranges are based upon the total weight of the composition. Determination of actual compositions is, in part, determined by the intended ultimate end-use application of the composition and the necessary properties needed for the application.

The compositions may further comprise at least one additive selected from the group consisting of flame retardants, glass fibers and mineral fillers. The compositions are preferably free of other thermoplastic materials, and more specifically are preferably free of polyamides, polyesters and polycarbonates. The composition is also preferably free of other impact modifiers, and other types of functionalizers. The composition preferably consists essentially of the above ingredients, and more preferably consists of the above ingredients.

It is desireable in the present compositions that the last three ingredients, i.e., the PPS, the epoxy functional elastomer, and the metal salt, and most specifically the metal salt be added at the downstream point of the mixing cycle. In other words, it is preferred that the PPE and the acid functionalizer be premixed prior to being mixed with the epoxy functional alpha-olefin elastomer and the metal salt in order to achieve the desired morphology and properties of the present compositions. It is preferred that the elastomeric block copolymer be added to the premix of PPE and the functionalizer. Thus, the PPS could be added either downstream or upstream.

It should also be clear that improved molded articles prepared from the compositions of the present invention represent an additional embodiment of this invention.

The following examples are provided to illustrate some embodiments of the present invention. They are not intended to limit the invention in any aspect. All percentages are by weight based on the total weight of the entire composition, unless otherwise indicated.

EXAMPLES

The compositions of Table 1 were extruded on a Werner-Pfleiderer twin-screw extruder capable of multiple feed and venting locations using a barrel set temperature of about 600° F. and a vacuum of 10–20 inches Hg applied to at least one vent port and were molded using a Toshiba injection molding machine using a barrel set temperature of about 600° F. and a mold temperature of about 250° F. Samples of the compositions were also subjected to measurement of the notched Izod impact strength according to ASTM D256 (employing a sample size of 2.5 inch by 0.5 inch by 0.125 inch), Dynatup (energy to fracture falling dart test) strength according to ASTM D3763 (using 4 inch diameter by 0.125 inch disks), flexural modulus and flexural strength according to ASTM D790 (employing a samples size of 6 inch by 0.5 inch by 0.25 inch), heat deflection under loads of 66 and 264 psi according to ASTM D648 (employing a sample size of 6 inch by 0.5 inch by 0.25 inch) and tensile yield and tensile elongation at break according to ASTM D638.

Note that Blend C exhibits enhanced unnotched Izod, notched Izod, falling dart impact, maximum tensile strength, and tensile elongation over compositions of Blend A and Blend B. Blend C illustrates the present invention, whereas Blend A and Blend B are comparative examples. Blend B involved premixing the PPE, the citric acid and the elastomeric block copolymer (ebc).

TABLE 1

|  | Blend A | Blend B | Blend C |
| --- | --- | --- | --- |
| PPE | 32.5 | 32.5 | 32.5 |
| Citric Acid | — | 0.7 | 0.7 |
| ebc | — | 5 | 5 |
| Pps | 55 | — | — |

TABLE 1-continued

|  | Blend A | Blend B | Blend C |
| --- | --- | --- | --- |
| efaoe | 12.5 | — | — |
| PPS(d/s)* | — | 55 | 55 |
| efaoe(d/s) | — | 7.5 | 7.5 |
| Zinc Stearate (d/s) | — | — | 0.2 |

*Note (d/s) denotes downstream feeding.

Properties

|  | | | |
| --- | --- | --- | --- |
| Un-notched Izod (kg-cm/cm) | 40 | 85 | >86(NB)* |
| Notched Izod (kg-cm/cm) | 1.5 | 5.1 | 9.1 |
| Falling Dart Impact (kg-cm)* | <25 | 40 | 125 |
| Max. Tensile Strength (kg/cm2) | 480 | 440 | 520 |
| Tensile Elongation @ break (%) | 8.2 | 14 | 27.5 |
| Flex Modulus (kg/cm2) | 21800 | 20600 | 22000 |
| Flex Strength (kg/cm2) | 755 | 725 | 825 |
| HDT @ 66 psi (° C.) | 114 | 115 | 123 |
| HDT @ 264 psi (° C.) | 200 | 181 | 194 |

*The falling dart weight is 3.6 kg. with a hemispherical head of ½ inch in diameter. NB = no break.
ebc is an elastomeric block copolymer (Kraton G1651 from Shell Chemical Company).
efaoe is an epoxy functional alpha-olefin elastomer (BONDFAST E) from Sumitomo Company.

The enhanced physical properties of the present invention (blend C) is evident from the property data shown in Table 1, wherein blend C reveals superior properties in all the measured properties over the comparative examples (blends A and B). It is especially desireable to have a combination of high Izod impact strength, high tensile elongation and high heat distortion temperature.

What is claimed is:

1. A thermoplastic composition comprising:
   (a) a functional poly(phenylene ether) resin;
   (b) an elastomeric block copolymer;
   (c) a poly(arylene sulfide) resin;
   (d) an epoxy functional alpha-olefin elastomer; and
   (e) from about 0.1% by weight to about 1.0% by weight of a metal salt of an organic acid based on the total weight of the composition.

2. The composition according to claim 1, wherein the functional poly(phenylene ether) resin is derived from:
   (a) a poly(phenylene ether) resin and
   (b) a compound comprising:
      (i) a carbon-carbon double bond or a carbon-carbon triple bond; and
      (ii) a carboxylic acid group, an anhydride group, a hydroxyl, a trialkyl ammonium carboxylate group, or an amino group.

3. The composition according to claim 1, wherein the functionalized poly(phenylene ether) resin is derived from:
   (a) a poly(phenylene ether) resin and
   (b) a compound selected from the group consisting of non-polymeric polycarboxylic acids, acid esters, and acid amides represented by the formula

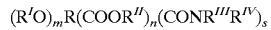

wherein R is a linear or branched chain, saturated aliphatic hydrocarbon of from 2 to 20 carbon atoms; $R^I$ is selected from the group consisting of hydrogen and an alkyl, aryl, acyl or carbonyl dioxy group each of 1 to 10 carbon atoms; $R^{II}$ is selected from the group consisting of hydrogen and an alkyl or aryl group each of from 1 to 20 carbon atoms; $R^{III}$ and $R^{IV}$ are independently selected from the group consisting of hydrogen and an alkyl or aryl group each of from 1 to 10 carbon atoms; m is equal to 1; (n+s) is greater than or equal to 2 and n and s are each greater than or equal to zero; and (OR$^r$) is alpha or beta to a carbonyl group and at least two carbonyl groups are separated by 2 to 6 carbon atoms.

4. The composition according to claim 1, wherein the functional poly(phenylene ether) resin is derived from:

(a) a poly(phenylene ether) resin and (b) a compound selected from the group consisting of citric acid, acrylic acid, maleic acid, maleic anhydride, malic acid, fumaric acid, and agaricic acid.

5. The composition according to claim 1, wherein the elastomeric block copolymer is derived from alkenylaromatic compounds and dienes.

6. The composition according to claim 1, wherein the epoxy functional alpha-olefin elastomer comprises about 60% to about 99.5% by weight of an alpha-olefin and about 0.5% to about 40% by weight of a glycidyl ester of an α,β-unsaturated carboxylic acid.

7. The composition of claim 1, wherein the functionalized poly(phenylene ether) resin is present at a level between about 10% and about 95% by weight based on the total weight of the composition; the elastomeric block copolymer is present at a level between about 1% and about 20% by weight based on the total weight of the composition; the poly(arylene sulfide) resin is present at a level of between about 10% and about 95% by weight based on the total weight of the composition; and the epoxy functional alpha-olefin elastomer is present at a level of between about 1% and about 20% by weight based on the total weight of the composition.

8. The composition according to claim 5, wherein the elastomeric block copolymer is selectively hydrogenated.

9. The composition according to claim 8, wherein the elastomeric block copolymer is an ABA triblock copolymer comprising polystyrene endblocks and a poly(ethylene-butylene) midblock.

10. A thermoplastic composition comprising, based on the total weight of the composition:

(a) about 10% to about 60% by weight of a poly(phenylene ether) resin;

(b) about 0.1% and about 5% by weight of a functionalizing agent selected from the group consisting of citric acid, maleic acid, maleic anhydride, fumaric acid, malic acid and agaricic acid;

(c) about 1% to about 20% by weight of an elastomeric block copolymer;

(d) about 40% to about 90% by weight of a poly(arylene sulfide) resin;

(e) about 1% to about 20% by weight of an epoxy functional alpha-olefin elastomer; and (f) about 0.1% to about 1.0% by weight of a metal salt of an organic acid.

11. The composition of claim 10, wherein said composition consists essentially of said poly(phenylene ether) resin (a), said functionalizing agent (b), said block copolymer (c), said poly(arylene sulfide) resin (d), said elastomer (e), and said metal salt (f).

12. The composition of claim 10, wherein said composition consists of said poly(phenylene ether) resin (a), said functionalizing agent (b), said block copolymer (c), said poly(arylene sulfide) resin (d), said elastomer (e), and said metal salt (f).

13. The composition of claim 10, wherein said poly(phenylene ether) resin is present at a level of from about 25% to about 40% by weight based on the total weight of the composition, and said poly(arylene sulfide) resin is present at a level of from about 45% to about 65% by weight based on the total weight of the composition.

14. The composition of claim 10, wherein said poly(phenylene ether) resin is present at a level of from about 30% to about 35% by weight based on the total weight of the composition, and said poly(arylene sulfide) resin is present at a level of from about 50% to about 60% by weight based on the total weight of the composition.

15. An article made from the composition of claim 1.

16. The composition of claim 1, wherein said composition is essentially free of polyamide resin.

17. The composition of claim 1, wherein said composition further comprises at least one additive selected from the group consisting of flame retardants, glass fibers and mineral fillers.

18. The composition of claim 1, wherein said composition is prepared by combining (a) and (b) to form a premix and subsequently combining the corresponding said premix with components (c), (d), (e), and (f).

19. The composition of claim 10, wherein said composition is prepared by combining component (a), (b), and (c) to form a pre-mix and subsequently combining the premix with the components (d), (e), and (f).

20. A thermoplastic composition comprising, based on the total weight of the composition:

(a) about 10% to about 60% by weight of a functional poly(phenylene ether) resin;

(b) about 1% to about 20% by weight of an elastomeric block copolymer;

(c) about 40% to about 90% by weight of a poly(arylene sulfide) resin;

(d) about 1% to about 20% by weight of an epoxy functional alpha-olefin elastomer; and (e) about 0.1% to about 1.0% by weight of a metal salt of an organic acid.

21. A method of making a thermoplastic composition comprising the steps of:

(a) mixing a poly(phenylene ether) resin with an effective amount of a functionalizing agent to form a functional poly(phenylene ether) resin, and (b) mixing the functional poly(phenylene ether) resin with an elastomeric block copolymer, an epoxy functional alpha-polyolefin elastomer, a poly(arylene sulfide) resin and from about 0.1% by weight to about 1.0% by weight of a metal salt of an organic acid based on the total weight of the composition.

22. The composition of claim 21, wherein the functionalizing agent is selected from the group consisting of citric acid, maleic acid, malic acid, fumaric acid, maleic anhydride and agaricic acid.

23. The composition of claim 21, wherein the epoxy functional alpha-olefin elastomer comprises about 60% to about 99.5% by weight of an alpha-olefin and about 0.5% to about 40% by weight of a glycidyl ester of an α,β-unsaturated carboxylic acid; based on the weight of the epoxy functional alpha-olefin elastomer.

* * * * *